US012689862B2

(12) United States Patent
Liang et al.

(10) Patent No.: US 12,689,862 B2
(45) Date of Patent: Jul. 21, 2026

(54) HEARING AID CONTROL METHOD, AND HEARING AID DEVICE AND STORAGE MEDIUM

(71) Applicant: Beijing LLVision Technology Co., Ltd., Beijing (CN)

(72) Inventors: Xianglong Liang, Beijing (CN); Fei Wu, Beijing (CN); Lin Ma, Beijing (CN); Zhiyuan Cheng, Beijing (CN); Jianming Zhang, Beijing (CN); Shenqiang Lou, Beijing (CN); Wei Zhao, Beijing (CN)

(73) Assignee: Beijing LLVision Technology Co., Ltd., Beijing (CN)

( * ) Notice: Subject to any disclaimer, the term of this patent is extended or adjusted under 35 U.S.C. 154(b) by 170 days.

(21) Appl. No.: 18/704,353

(22) PCT Filed: May 18, 2022

(86) PCT No.: PCT/CN2022/093543
§ 371 (c)(1),
(2) Date: Apr. 24, 2024

(87) PCT Pub. No.: WO2023/071155
PCT Pub. Date: May 4, 2023

(65) Prior Publication Data
US 2025/0008279 A1 Jan. 2, 2025

(30) Foreign Application Priority Data

Oct. 25, 2021 (CN) .......................... 202111252280.1

(51) Int. Cl.
*H04R 25/00* (2006.01)
*G02B 27/01* (2006.01)
*G10L 15/26* (2006.01)

(52) U.S. Cl.
CPC ......... *H04R 25/70* (2013.01); *G02B 27/0172* (2013.01); *G10L 15/26* (2013.01); *H04R 25/30* (2013.01); *G02B 2027/0178* (2013.01); *H04R 2460/13* (2013.01); *H04R 2499/15* (2013.01)

(58) Field of Classification Search
CPC .... H04R 25/70; H04R 25/30; H04R 2460/13; G02B 27/0172; G10L 15/26
(Continued)

(56) References Cited

U.S. PATENT DOCUMENTS

2015/0319546 A1 11/2015 Sprague
2017/0127196 A1* 5/2017 Blum ................... H04R 25/554
(Continued)

FOREIGN PATENT DOCUMENTS

CN        103297889 A        9/2013
CN        106104683 A        11/2016
(Continued)

OTHER PUBLICATIONS

International Search Report for International Application No. PCT/CN2022/093543.
(Continued)

*Primary Examiner* — Thjuan K Addy
(74) *Attorney, Agent, or Firm* — Perilla Knox & Hildebrandt LLP; Kenneth A. Knox

(57) ABSTRACT

The present disclosure relates to the technical field of wearable devices. Provided are a hearing aid control method and apparatus, a hearing aid device, and a storage medium. The hearing aid control method includes: displaying a hearing detection image in a viewing window area of the pair of augmented reality (AR) glasses, playing hearing test audio to acquire a feedback signal from a user wearing the hearing aid device based on the hearing test audio, and determining a hearing assessment result for the user based on the feedback signal; in response to determining, based on
(Continued)

the hearing assessment result, that a display operation is required to be performed by the hearing aid device, collecting speech information; and converting the speech information into text information upon the collection of the speech information, and displaying the text information in the viewing window area of the pair of AR glasses.

15 Claims, 6 Drawing Sheets

(58) Field of Classification Search
USPC .................................. 381/328, 312, 322, 380
See application file for complete search history.

(56) References Cited

U.S. PATENT DOCUMENTS

| | | | |
|---|---|---|---|
| 2020/0265839 A1 | 8/2020 | Mcanallan | |
| 2022/0005040 A1* | 1/2022 | Edwards | G06Q 20/4015 |
| 2023/0089522 A1* | 3/2023 | Legerton | G16H 50/20 |
| | | | 600/301 |

FOREIGN PATENT DOCUMENTS

| | | | |
|---|---|---|---|
| CN | 207612422 U | 7/2018 | |
| CN | 108702580 A | 10/2018 | |
| CN | 108877407 A | 11/2018 | |
| CN | 108962254 A | 12/2018 | |
| CN | 110719558 A | 1/2020 | |
| CN | 111447539 A | 7/2020 | |
| CN | 111640448 A | 9/2020 | |
| CN | 214205842 U | 9/2021 | |
| CN | 114007177 A | 2/2022 | |
| EP | 2536170 A1 | 12/2012 | |
| EP | 3409319 A1 | 12/2018 | |
| WO | 2016167877 A1 | 10/2016 | |

OTHER PUBLICATIONS

First Office Action for CN Patent Application No. 202111252280.1.

* cited by examiner

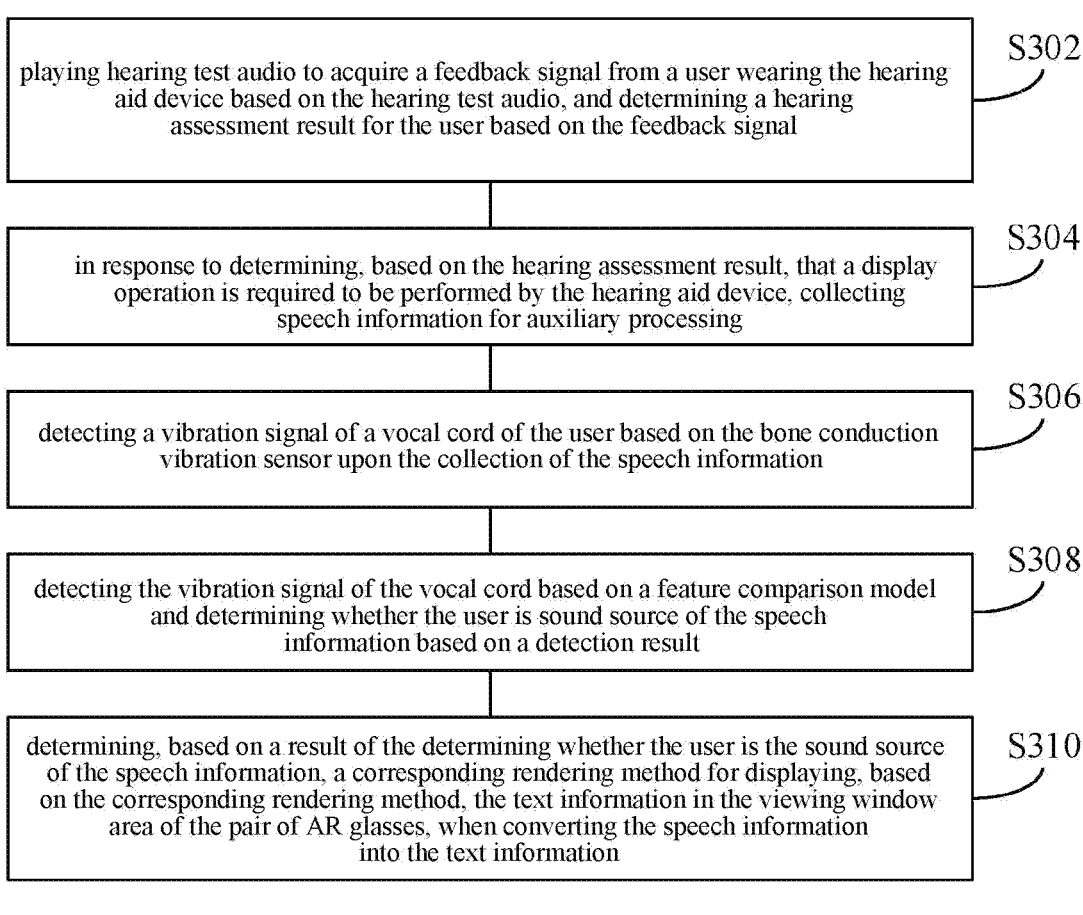

playing hearing test audio to acquire a feedback signal from a user wearing the hearing aid device based on the hearing test audio, and determining a hearing assessment result for the user based on the feedback signal — S302 in response to determining, based on the hearing assessment result, that a display operation is required to be performed by the hearing aid device, collecting speech information for auxiliary processing — S304 detecting a vibration signal of a vocal cord of the user based on the bone conduction vibration sensor upon the collection of the speech information — S306 detecting the vibration signal of the vocal cord based on a feature comparison model and determining whether the user is sound source of the speech information based on a detection result — S308 determining, based on a result of the determining whether the user is the sound source of the speech information, a corresponding rendering method for displaying, based on the corresponding rendering method, the text information in the viewing window area of the pair of AR glasses, when converting the speech information into the text information — S310

FIG. 3

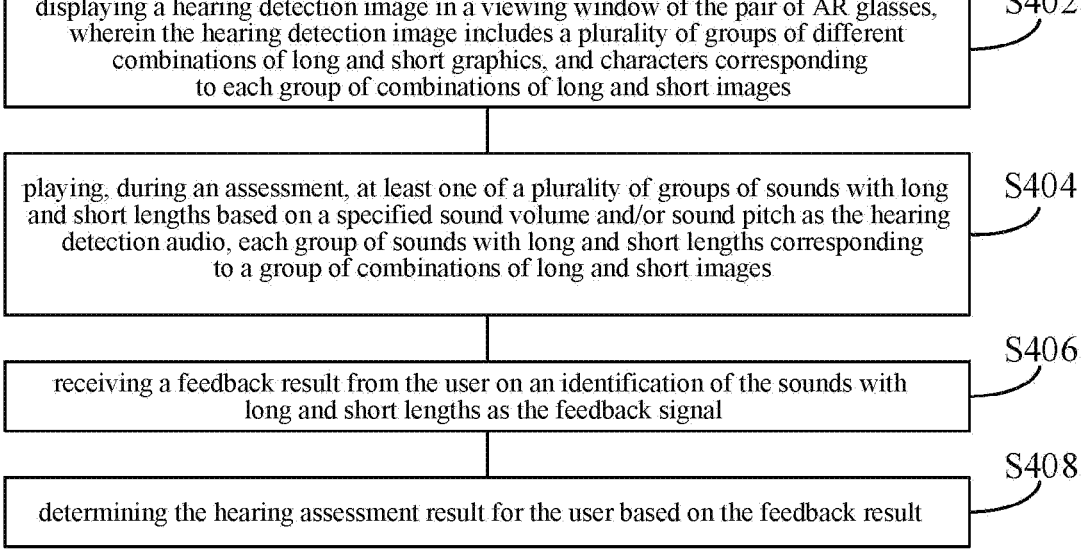

displaying a hearing detection image in a viewing window of the pair of AR glasses, wherein the hearing detection image includes a plurality of groups of different combinations of long and short graphics, and characters corresponding to each group of combinations of long and short images — S402 playing, during an assessment, at least one of a plurality of groups of sounds with long and short lengths based on a specified sound volume and/or sound pitch as the hearing detection audio, each group of sounds with long and short lengths corresponding to a group of combinations of long and short images — S404 receiving a feedback result from the user on an identification of the sounds with long and short lengths as the feedback signal — S406 determining the hearing assessment result for the user based on the feedback result — S408

FIG. 4

| | |
|---|---|
| determining, based on the feedback result, a feedback character fed back from the user | S602 |
| detecting whether the feedback character is correct | S604 |
| evaluating, based on the detection result, a volume range recognizable to the user and a type of pitch loss of the user, as the hearing assessment result for the user | S606 |

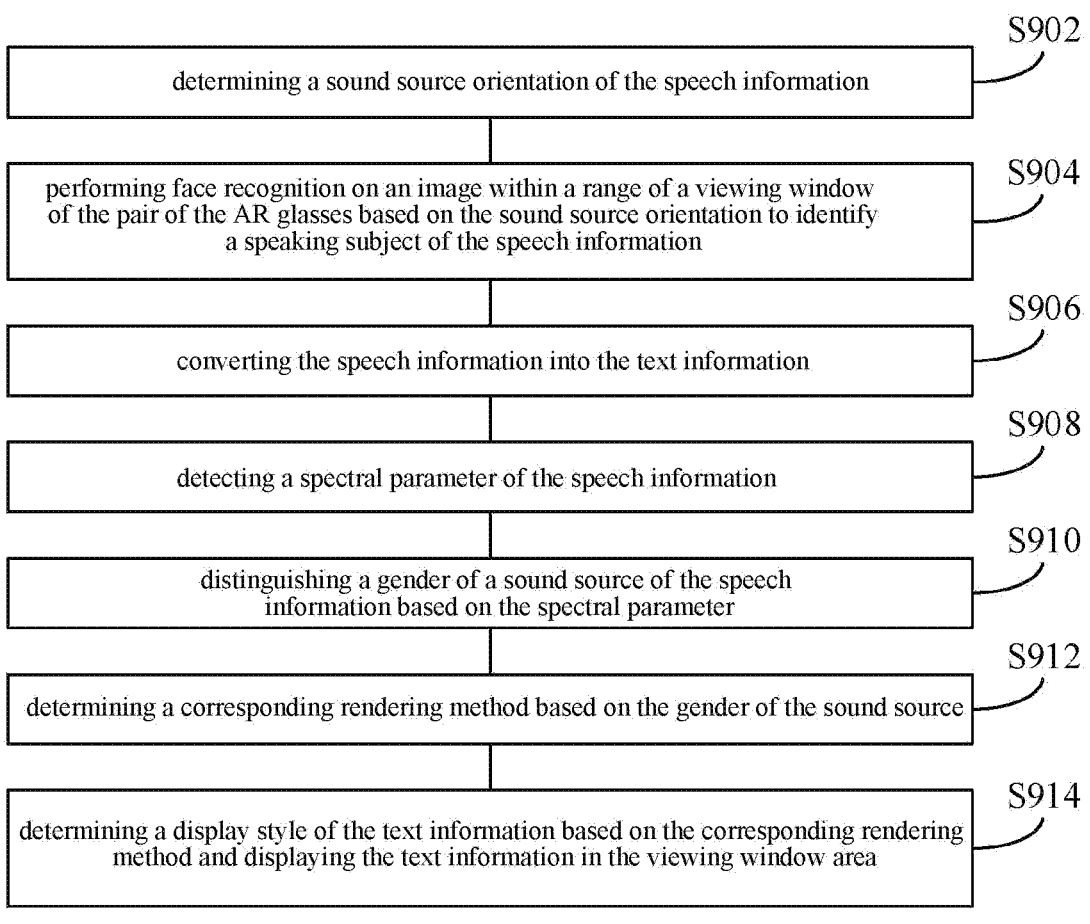

determining a sound source orientation of the speech information  — S902 performing face recognition on an image within a range of a viewing window of the pair of the AR glasses based on the sound source orientation to identify a speaking subject of the speech information  — S904 converting the speech information into the text information  — S906 detecting a spectral parameter of the speech information  — S908 distinguishing a gender of a sound source of the speech information based on the spectral parameter  — S910 determining a corresponding rendering method based on the gender of the sound source  — S912 determining a display style of the text information based on the corresponding rendering method and displaying the text information in the viewing window area  — S914

FIG. 9

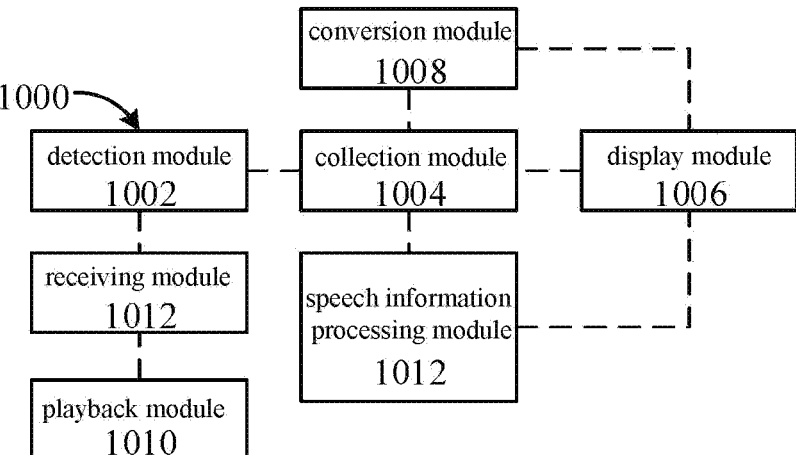

conversion module
1008

1000 detection module
1002 collection module
1004 display module
1006 receiving module
1012 speech information processing module
1012 playback module
1010

HEARING AID CONTROL METHOD, AND HEARING AID DEVICE AND STORAGE MEDIUM

CROSS-REFERENCE TO RELATED APPLICATIONS

The present disclosure is a national phase application under 35 U.S.C. § 371 of International Application No. PCT/CN2022/093543, filed on May 18, 2022, which claims the benefit of and priority to Chinese Patent Application No. 202111252280.1, filed on Oct. 25, 2021 and entitled "HEARING AID CONTROL METHOD AND APPARA-TUS, AND HEARING AID DEVICE, AND STORAGE MEDIUM", the entire contents of both of which are incorporated herein by reference in their entireties.

TECHNICAL FIELD

The present disclosure relates to the field of wearable device technology and, in particular, to a hearing aid control method, a hearing aid device, and a computer-readable storage medium.

BACKGROUND

Although current hearing aid devices can collect sounds from a gaze area of a user using wearable devices, such solutions amplify collected sounds and merely play them back to a hearing-impaired user, which is ineffective for patients with severe deafness or complete loss of hearing, resulting in certain limitations.

It should be noted that the information disclosed above in the "BACKGROUND" section is only for enhancing the understanding of the background of the present disclosure, and thus may include information that does not constitute prior art known to those of ordinary skill in the art.

SUMMARY

The present disclosure is intended to provide a hearing aid control method, a hearing aid device, and a computer-readable storage medium.

Other features and advantages of the present disclosure will become apparent through the following detailed description, or will be learned in part through the practice of the present disclosure.

According to an aspect of the present disclosure, there is provided a hearing aid control method applied to a hearing aid device. The hearing aid device includes a pair of Aug-mented Reality (AR) glasses, a sound collection device, and an in-ear broadcasting device that are provided in the pair of AR glasses. The sound collection device is configured to collect speech, and the in-ear broadcasting device is con-figured to play audio. The hearing aid control method includes: playing hearing test audio to acquire a feedback signal from a user wearing the hearing aid device based on the hearing test audio, and determining a hearing assessment result for the user based on the feedback signal; in response to determining, based on the hearing assessment result, that a display operation is required to be performed by the hearing aid device, collecting speech information for aux-iliary processing; and converting the speech information into text information upon the collection of the speech informa-tion, and displaying the text information in a viewing window area of the pair of AR glasses.

In an embodiment, the hearing aid device further includes a bone conduction vibration sensor in the pair of AR glasses, the bone conduction vibration sensor being touchable to a skull region of the user. Converting the speech information into the text information upon the collection of the speech information, and displaying the text information in the viewing window area of the pair of AR glasses, further includes: detecting a vibration signal of a vocal cord of the user based on the bone conduction vibration sensor upon the collection of the speech information; detecting the vibration signal of the vocal cord based on a feature comparison model and determining whether the user is sound source of the speech information based on a detection result; and determining, based on a result of the determining whether the user is the sound source of the speech information, a corresponding rendering method for displaying, based on the corresponding rendering method, the text information in the viewing window area of the pair of AR glasses, when converting the speech information into the text information. Different rendering methods are configured based on at least one of: color, font, display ratio, or display speed.

In an embodiment, determining, based on the result of the determining whether the user is the sound source of the speech information, the corresponding rendering method for displaying, based on the corresponding rendering method, the text information in the viewing window area of the pair of AR glasses, when converting the speech information into the text information, further includes: performing the dis-play operation based on a first rendering method in response to determining that the user is not the sound source of the speech information; performing the display operation based on a second rendering method in response to determining that the user is the sound source of the speech information. When displaying the text information based on the second rendering method, feedback information of the user is received to determine a pronunciation level of the user based on the feedback information.

In an embodiment, converting the speech information into the text information, and displaying the text information in the viewing window area of the pair of AR glasses, further includes: determining a sound source orientation of the speech information; performing face recognition on an image within a range of a viewing window of the pair of the AR glasses based on the sound source orientation to identify a speaking subject of the speech information; and converting the speech information into the text information and dis-playing the text information in the viewing window area, corresponding to the speaking subject, on the hearing aid device.

In an embodiment, converting the speech information into the text information, and displaying the text information in the viewing window area of the pair of AR glasses, further includes: detecting a spectral parameter of the speech infor-mation; distinguishing a gender of a sound source of the speech information based on the spectral parameter; deter-mining a corresponding rendering method based on the gender of the sound source; and determining a display style of the text information based on the corresponding rendering method and displaying the text information in the viewing window area.

In an embodiment, converting the speech information into the text information, and displaying the text information in the viewing window area of the pair of AR glasses, further includes: detecting a distance from the speaking subject based on a visual feature of the speaking subject; and synchronously adjusting a size of a text box of the text information based on the detected distance from the speaking object.

In an embodiment, converting the speech information into the text information upon the collection of the speech information, and displaying the text information in the viewing window area of the pair of AR glasses, further includes: invoking, in response to detecting that the collected speech information is to-be-translated speech information, a translation model of a target language to translate the to-be-translated speech information, and obtaining translated text; and displaying the translated text as the text information in the viewing window area of the pair of AR glasses.

In an embodiment, playing the hearing test audio to acquire the feedback signal from the user wearing the hearing aid device based on the hearing test audio, and determining the hearing assessment result for the user based on the feedback signal, further includes: displaying a hearing detection image in the viewing window area of the pair of AR glasses, wherein the hearing detection image includes a plurality of groups of different combinations of long and short graphics, and characters corresponding to each group of combinations of long and short images; playing, during an assessment, at least one of a plurality of groups of sounds with long and short lengths based on a specified sound volume and/or sound pitch as the hearing detection audio, each group of sounds with long and short lengths corresponding to a group of combinations of long and short images; receiving a feedback result from the user on an identification of the sounds with long and short lengths as the feedback signal; and determining the hearing assessment result for the user based on the feedback result, wherein the sound volume includes bass, alto, and soprano, and the sound pitch includes low frequency, mid-frequency, and high frequency, and wherein a plurality of assessments are performed based on different sound volumes and/or different sound pitches.

In an embodiment, receiving the feedback result from the user on the identification of the sounds with long and short lengths, further includes: displaying, after playing the sounds with long and short lengths, a correct option and an incorrect option for the characters corresponding to the sounds with long and short lengths in the viewing window; and receiving a selection result from the user for the correct option and the incorrect option, and determining the selection result as the feedback result.

In an embodiment, receiving the feedback result from the user on the identification of the sounds with long and short lengths, further includes: collecting a recognition speech from the user for the characters corresponding to the sounds with long and short lengths, and determining the recognition speech as the feedback result.

In an embodiment, determining the hearing assessment result for the user based on the feedback result, further includes: determining, based on the feedback result, a feedback character fed back from the user; detecting whether the feedback character is correct; and evaluating, based on the detection result, a volume range recognizable to the user and a type of pitch loss of the user, as the hearing assessment result for the user.

In an embodiment, before collecting the speech information for auxiliary processing in response to determining, based on the hearing assessment result, that the display operation is required to be performed by the hearing aid device, the method further includes: when the volume range is a first volume range, performing an amplification operation on the collected speech information; when the volume range is a second volume range, performing the amplification operation and the display operation on the collected speech information; when the volume range is a third volume range, performing the display operation on the collected speech information.

In an embodiment, performing the amplification operation on the collected speech information further includes: detecting an intensity parameter and a frequency parameter of the speech information; and adopting a dynamic amplifier to automatically adjust a gain of the intensity parameter and the frequency parameter to adjust the intensity parameter and the frequency parameter to a comfortable listening range.

In an embodiment, performing the amplification operation on the collected speech information, further includes: upon detecting a presence of the pitch loss of the user, performing a compensation operation, according to the type of the pitch loss of the user, for missing frequencies of the speech information for which the amplification operation is to be performed.

According to yet another aspect of the present disclosure, there is provided a hearing aid device, including a pair of Augmented Reality (AR) glasses; an in-ear broadcasting device provided in the pair of AR glasses, configured to play hearing test audio; a processor configured to acquire a feedback signal from a user wearing the hearing aid device based on the hearing test audio, and to determine a hearing assessment result for the user based on the feedback signal; and a sound collection device provided in the pair of AR glasses, configured to collect speech information for auxiliary processing, in response to determining, based on the hearing assessment result, that a display operation is required to be performed by the hearing aid device. The pair of AR glasses is further configured to convert the speech information into text information upon the collection of the speech information, and to display the text information in a viewing window area of the pair of AR glasses.

In an embodiment, the device further includes a bone conduction vibration sensor provided in the pair of AR glasses, the bone conduction vibration sensor being touchable to a region of a vocal cord of the user and configured to detect a vibration signal of the vocal cord of the user. The processor is further configured to detect the vibration signal of the vocal cord based on a feature comparison model to determine whether the user is sound source of the speech information. The processor is further configured to convert the speech information into the text information in response to determining that the user is not the sound source of the speech information.

According to yet another aspect of the present disclosure, there is provided a hearing aid device, including a processor; and a memory for storing instructions executable by the processor. The processor is configured to perform the hearing aid control method described in another aspect above by executing the executable instructions.

According to yet another aspect of the present disclosure, there is provided a computer-readable storage medium having stored thereon a computer program, wherein the computer program, when executed by a processor, causes the processor to implement the hearing aid control method of any of the foregoing embodiments.

It should be noted that the above general description and the following detailed description are merely exemplary and explanatory and should not be construed as limiting of the present disclosure.

BRIEF DESCRIPTION OF THE DRAWINGS

The accompanying drawings, which are incorporated in the specification and constitute a part of the specification, show embodiments consistent with the present disclosure and are used in conjunction with the specification to explain the principles of the present disclosure. It is understood that the drawings in the following description show only some of the embodiments of the present disclosure, and other drawings may be obtained without creative effort by those of ordinary skill in the art based on theses drawings.

FIG. 3 illustrates a flowchart of another hearing aid control method in an embodiment of the present disclosure.

FIG. 4 illustrates a flowchart of yet another hearing aid control method in an embodiment of the present disclosure.

FIG. 9 illustrates a flowchart of yet another hearing aid control method in an embodiment of the present disclosure.

FIG. 10 illustrates a schematic diagram of a hearing aid control apparatus in an embodiment of the present disclosure.

DETAILED DESCRIPTION

Figure 1:
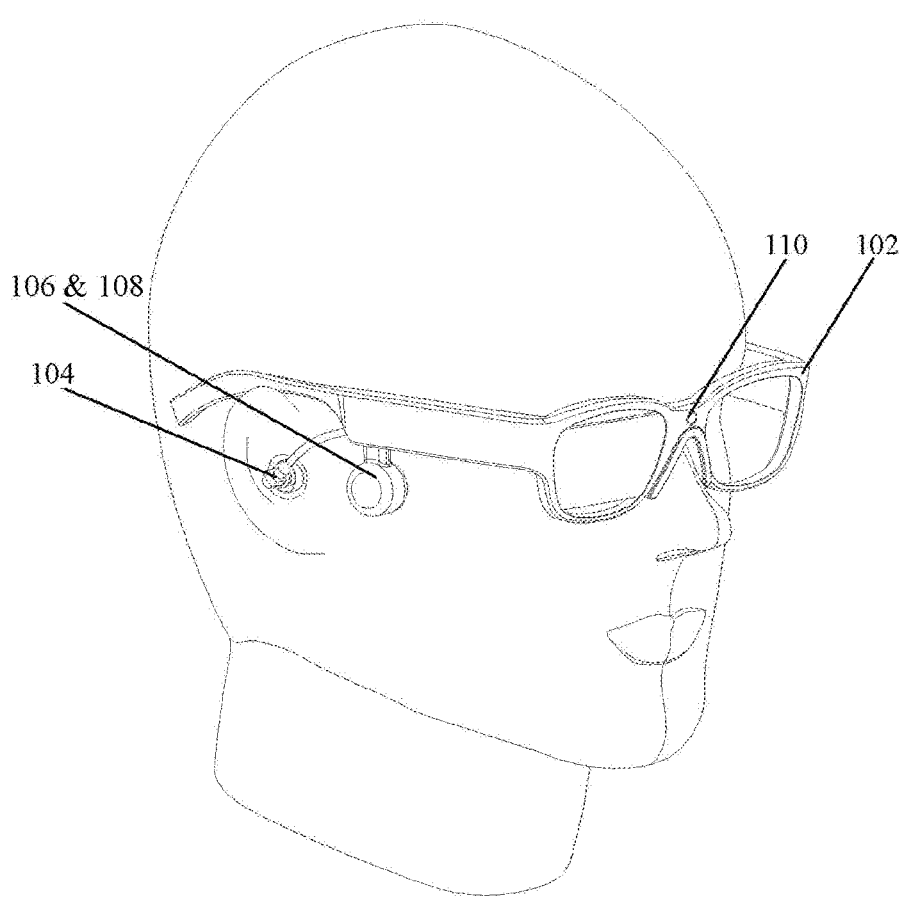
FIG. 1 illustrates a schematic diagram of a structure of a hearing aid device in an embodiment of the present disclosure.

Exemplary embodiments will now be described more fully with reference to the accompanying drawings. However, the embodiments can be implemented in a variety of forms and should not be construed as being limited to the examples set forth herein; rather, these embodiments are provided so that the present disclosure will be more comprehensive and complete to convey the concepts of the exemplary embodiments to those skilled in this art. The described features, structures, or characteristics may be combined in one or more embodiments in any suitable manner.

In addition, the accompanying drawings are merely schematic illustrations of the present disclosure and are not necessarily drawn to scale. The same reference numerals in the drawings denote the same or similar parts, and the repeated description thereof will be omitted. Some of the block diagrams shown in the drawings are functional entities and do not necessarily correspond to physically or logically separate entities. These functional entities may be implemented in software, or implemented in one or more hardware modules or integrated circuits, or implemented in different networks and/or processor devices and/or microcontroller devices.

As shown in FIG. 1, according to a further aspect of the present disclosure, a hearing aid device is provided, comprising:

a pair of Augmented Reality (AR) glasses 102;

an in-ear broadcasting device 104 provided in the AR glasses 102, configured to play hearing test audio;

a processor (not shown) configured to acquire a feedback signal from a user wearing the hearing aid device based on the hearing test audio, and to determine a hearing assessment result for the user based on the feedback signal; and a sound collection device 106 provided in the AR glasses 102, configured to collect speech information for auxiliary processing in response to determining, based on the hearing assessment result, that a display operation is required to be performed by the hearing aid device.

The AR glasses 102 are further configured to convert the speech information into text information upon the collection of the speech information, and to display the text information in a viewing window area of the AR glasses 102.

A bone conduction vibration sensor 108 is provided in the AR glasses 102. The bone conduction vibration sensor is touchable to a region of a vocal cord of the user, and the bone conduction vibration sensor is configured to detect a vibration signal of the vocal cord of the user.

The processor is further configured to detect the vibration signal of the vocal cord based on a feature comparison model to determine whether the user is sound source of the speech information.

The processor is further configured to convert the speech information into the text information in response to determining that the user is not the sound source of the speech information.

An image acquisition device 110 is provided in the AR glasses 102, and is configured to acquire an image within a range of a viewing window.

The processor is further configured to perform face recognition on the image within the range of the viewing window of the AR glasses 102 based on a sound source orientation, in order to identify a speaking subject of the speech information. The processor can include one or more hardware processors.

The processor is further configured to convert the speech information into the text information and to display the text information in the viewing window area, corresponding to the speaking subject, on the hearing aid device.

Various steps in the hearing aid control method in this exemplary embodiment will be described in more detail below, based on FIG. 1, in conjunction with other accompanying drawings and embodiments.

Figure 2:
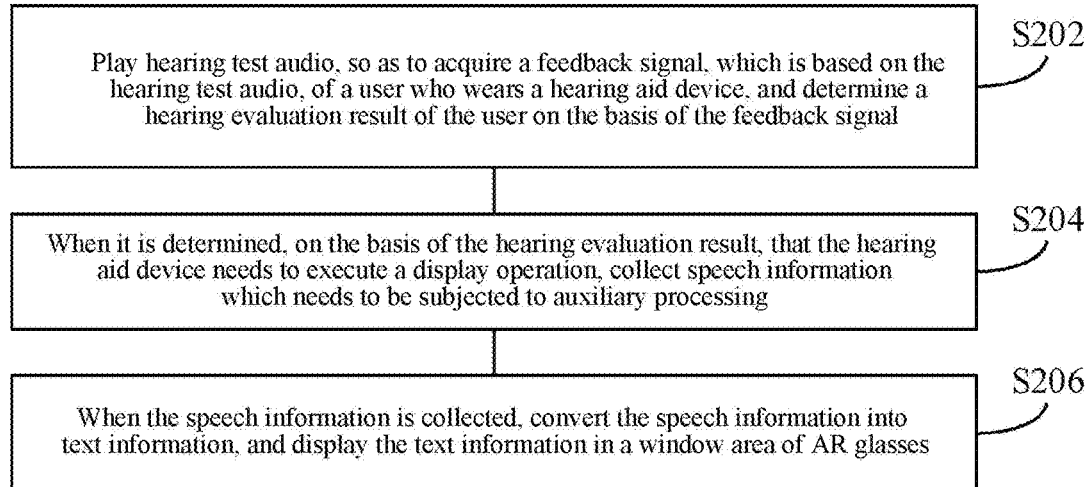
FIG. 2 illustrates a flowchart of a hearing aid control method in an embodiment of the present disclosure.

FIG. 2 illustrates a flowchart of a hearing aid control method in an embodiment of the present disclosure.

As shown in FIG. 2, a hearing aid device performs the hearing aid control method. The hearing aid device includes AR glasses, a sound collection device, and an in-ear broadcasting device that are provided in the AR glasses. There may be one or more sound collection devices. The sound collection device is configured to collect speech. The in-ear broadcasting device is configured to play audio. The method includes the following steps.

Step S202, playing hearing test audio to acquire a feedback signal from a user wearing the hearing aid device based on the hearing test audio, and determining a hearing assessment result for the user based on the feedback signal.

After playing the hearing test audio, a feedback signal from the user wearing the hearing aid device is received in response to the test audio. The feedback signal may be a voice signal, a blinking signal, or a touch signal to a designated area on the hearing aid device, from the user.

Specifically, the hearing test audio may be played through the in-ear broadcasting device 104.

Step S204, in response to determining, based on the hearing assessment result, that a display operation is required to be performed by the hearing aid device, collecting speech information for auxiliary processing.

Typically, the user wearing the hearing aid device is a user with a hearing loss or hearing impairment that includes, but is not limited to, an intensity loss and/or a pitch loss.

In the present disclosure, intensity is categorized into high, medium, and low intensity ranges, and pitch is categorized into high, medium, and low frequency ranges.

Specifically, the intensity of a sound is its loudness, and subjectively, the loudness of the sound (often referred to as volume) is determined by the "amplitude" and the distance from the sound source. The greater the amplitude and the smaller the distance between the sound source and the listener, the greater the loudness.

Pitch, on the other hand, refers to treble and bass, which is determined by "frequency". The higher the frequency (measured in hertz, for example), the higher the pitch. The human ear can hear frequencies ranging from 20 to 20,000 hertz. Sounds below 20 Hz are called infrasound, and those above 20,000 Hz are known as ultrasound.

Step S206, converting the speech information into text information upon the collection of the speech information, and displaying the text information in a viewing window area of the pair of AR glasses.

In this embodiment, the hearing level of the user wearing the hearing aid device is detected in advance, so that when it is determined that a hearing aid operation needs to be performed based on the hearing level, the collected speech information is converted into text information and displayed in the viewing window area of the AR glasses of the hearing aid device. On one hand, the reliability of the hearing aid operation is ensured by detecting the hearing level of the wearer and determining whether to perform the display-based hearing aid operation based on the hearing level. On the other hand, the effect of the hearing aid operation is enhanced through the realization of the hearing aid by transforming the hearing into the visual one.

In an embodiment, the hearing aid device further includes a bone conduction vibration sensor provided in the AR glasses. The bone conduction vibration sensor may specifically be a bone conduction microphone or an audio accelerometer, and the bone conduction vibration sensor is able to be in contact with a skull region of the user.

As shown in FIG. 3, a hearing aid control method according to another embodiment of the present disclosure, specifically includes the following steps.

Step S302, playing hearing test audio to acquire a feedback signal from a user wearing the hearing aid device based on the hearing test audio, and determining a hearing assessment result for the user based on the feedback signal.

Step S304, in response to determining, based on the hearing assessment result, that a display operation is required to be performed by the hearing aid device, collecting speech information for auxiliary processing.

Step S306, detecting a vibration signal of a vocal cord of the user based on the bone conduction vibration sensor upon the collection of the speech information.

Step S308: detecting the vibration signal of the vocal cord based on a feature comparison model and determining whether the user is sound source of the speech information based on a detection result.

Step S310, determining, based on a result of the determining whether the user is the sound source of the speech information, a corresponding rendering method for displaying, based on the corresponding rendering method, the text information in the viewing window area of the pair of AR glasses when converting the speech information into the text information.

Different rendering methods are configured based on at least one of: color, font, display ratio, or display speed.

Specifically, in an embodiment, determining, based on the result of the determining whether the user is the sound source of the speech information, the corresponding rendering method for displaying, based on the corresponding rendering method, the text information in the viewing window area of the pair of AR glasses, when converting the speech information into the text information, further includes:

performing the display operation based on a first rendering method in response to determining that the user is not the sound source of the speech information. Specifically, the first rendering method may be displayed based on the rendering method described in FIG. 8 and/or FIG. 9; and performing the display operation based on a second rendering method in response to determining that the user is the sound source of the speech information.

Specifically, different sizes and colors of fonts may be used along with different display methods to distinguish between the first rendering method and the second rendering method, e.g., the first rendering method employs a scrolling display and the second rendering method employs a full-area static display.

In addition, when displaying the text information based on the second rendering method, feedback information is received from the user to determine a pronunciation level of the user based on the feedback information.

In this embodiment, by providing a bone conduction vibration sensor for detecting a vibration signal of the user's vocal cord, when the hearing aid device receives the speech information, based on the vibration signal of the vocal cord, it detects whether or not the user is the sound source of the speech information, and when it detects that the user is not the sound source of the speech information, the hearing aid in the visual direction is realized by transforming the speech information into text information. This solution can reduce the probability that the hearing aid device coverts the user's own speech into text, and improve the reliability of the visual-based hearing aid operation.

When the user is detected as the sound source of the voice information, the hearing aid device is used to detect the user's language expression ability, which is conducive to assisting in improving the user's occlusion and pronunciation, and then improve the level of language communication.

As shown in FIG. 4, in an embodiment, a specific implementation of the step S202 in which playing the hearing test audio to acquire the feedback signal from the user wearing the hearing aid device based on the hearing test audio, and determining the hearing assessment result for the user based on the feedback signal, includes the following steps.

Step S402, displaying a hearing detection image in a viewing window of the pair of AR glasses, wherein the hearing detection image includes a plurality of groups of different combinations of long and short graphics, and characters corresponding to each group of combinations of long and short images.

Step S404, playing, during an assessment, at least one of a plurality of groups of sounds with long and short lengths based on a specified sound volume and/or sound pitch as the hearing detection audio, each group of sounds with long and short lengths corresponding to a group of combinations of long and short images.

Figure 5:
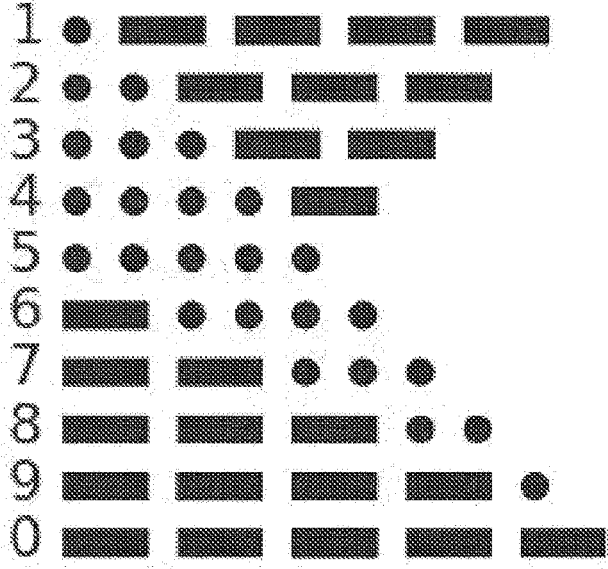
FIG. 5 illustrates a schematic diagram of characters for hearing detection in an embodiment of the present disclosure.

As shown in FIG. 5, taking numbers as an example, for ten numbers from 0 to 9, each number is represented by a combination of short and long tick sounds. The combinations of short and long tick sounds serve as the hearing detection audio, one of which is played each time.

The sound volume includes bass, alto, and soprano, and the sound pitch includes low frequency, mid-frequency, and high frequency. A plurality of assessments are performed based on different sound volumes and/or different sound pitches.

Step 406, receiving a feedback result from the user on an identification of the sounds with long and short lengths as the feedback signal.

Step S408, determining the hearing assessment result for the user based on the feedback result.

In this embodiment, by using the viewing window display function of the AR glasses, a plurality of characters for detecting the hearing of the user are displayed, and then audio of a combination of sounds with long and short lengths, corresponding to at least one of the plurality of characters, is played through a headset to receive the user's recognition results of the characters corresponding to the audio of the combination of sounds with long and short lengths. The hearing level of the user is assessed by the recognition result, and the hearing assessment result is obtained, realizing the hearing assessment function of the hearing aid device, which enables the hearing aid device to perform targeted hearing aid operation based on the hearing assessment result to enhance the hearing aid effect.

Specifically, based on the intensity thresholds and pitch thresholds in Table 1, the hearing assessment results are set as follows: greater than or equal to 30 dB and less than 60 dB for a first volume range, greater than or equal to 60 dB and less than or equal to 90 dB for a second volume range, and greater than 90 dB for a third volume range. The wearer describes whether the tick sound he/she hears corresponds to an accurate number or not, and the hearing level of the wearer is determined by combining the wearer's hearing feedback.

TABLE 1

| | Pitch threshold of tick sound | | |
| --- | --- | --- | --- |
| | 250 Hz | 500 Hz | 1000 Hz |
| Intensity threshold (30 dB) | First volume range | First volume range | First volume range |
| Intensity threshold (60 dB) | Second volume range | Second volume range | Second volume range |
| Intensity threshold (90 dB) | Third volume range | Third volume range | Third volume range |

In an embodiment, a specific implementation of the step S406 in which, receiving the feedback result from the user on the identification of the sounds with long and short lengths, includes: displaying, after playing the sounds with long and short lengths, a correct option and an incorrect option for the characters corresponding to the sounds with long and short lengths in the viewing window; and receiving a selection result from the user for the correct option and the incorrect option, and determining the selection result as the feedback result.

In this embodiment, the feedback result is obtained by receiving the selection result from the user for the correct option and the incorrect option, and the selection operation of the correct option and the incorrect option can be realized by receiving the user's touch operation on different areas of the hearing aid device.

In an embodiment, another specific implementation of the step S406 in which, receiving the feedback result from the user on the identification of the sounds with long and short lengths, includes: collecting a recognition speech from the user for the characters corresponding to the sounds with long and short lengths, and determining the recognition speech as the feedback result.

In this embodiment, the recognition speech of the character is received from the user as the feedback result.

Figure 6:
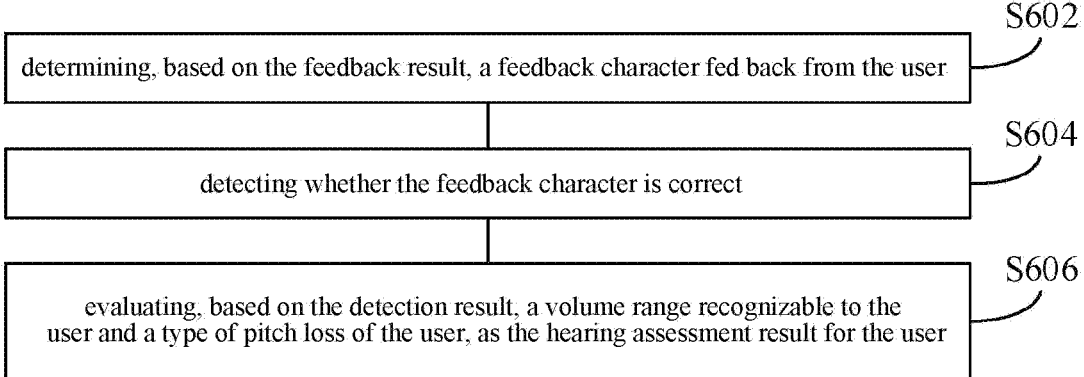
FIG. 6 illustrates a flowchart of yet another hearing aid control method in an embodiment of the present disclosure.

As shown in FIG. 6, in an embodiment, a specific implementation of the step S408 in which, determining the hearing assessment result for the user based on the feedback result, includes the following steps.

Step S602, determining, based on the feedback result, a feedback character fed back from the user.

Step S604, detecting whether the feedback character is correct.

Step S606, evaluating, based on the detection result, a volume range recognizable to the user and a type of pitch loss of the user, as the hearing assessment result for the user.

Figures 7, 8:
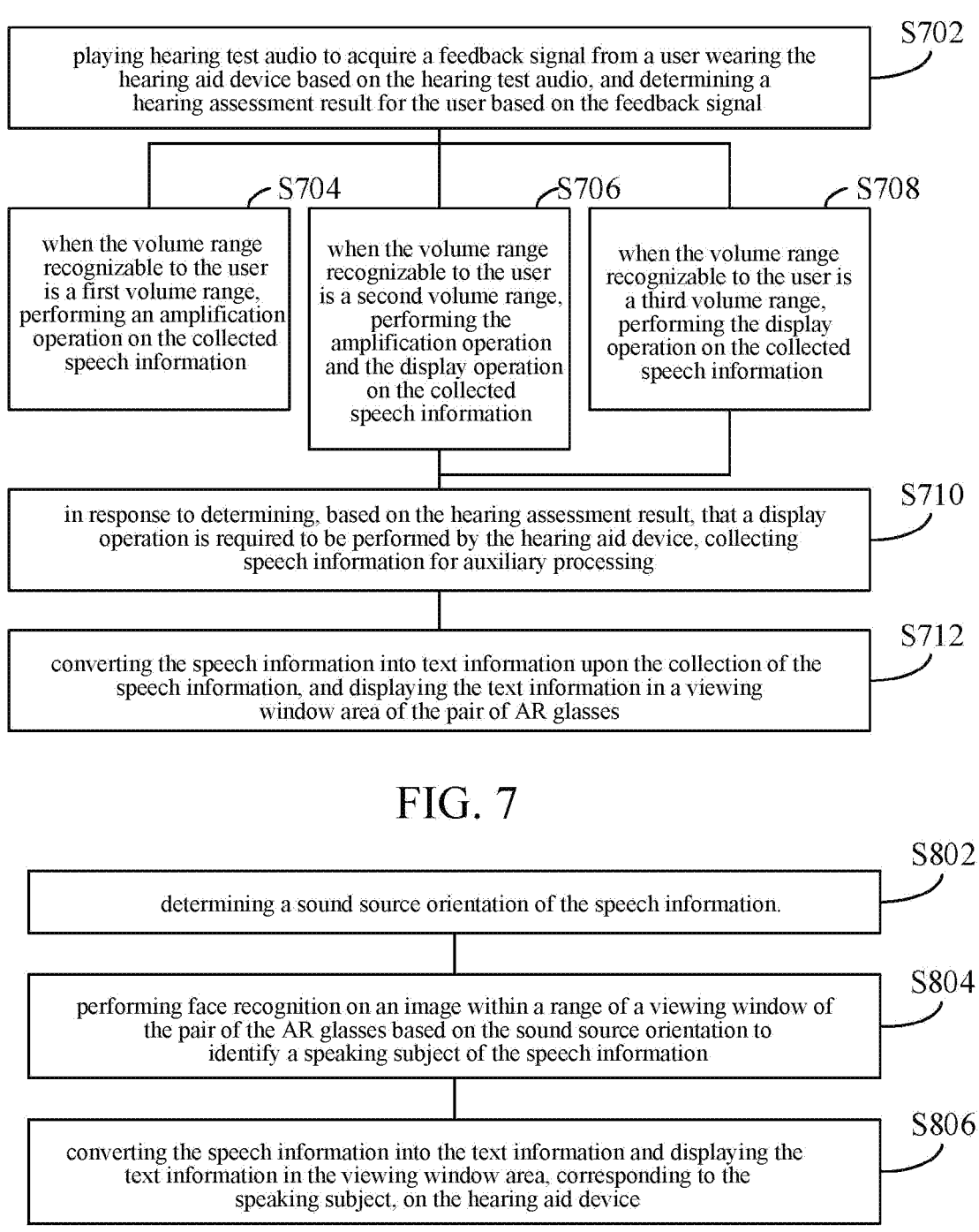
FIG. 7 illustrates a flowchart of yet another hearing aid control method in an embodiment of the present disclosure.
FIG. 8 illustrates a flowchart of yet another hearing aid control method in an embodiment of the present disclosure.

As shown in FIG. 7, a hearing aid control method according to a further embodiment of the present disclosure, specifically includes the following steps.

Step S702, playing hearing test audio to acquire a feedback signal from a user wearing the hearing aid device based on the hearing test audio, and determining a hearing assessment result for the user based on the feedback signal.

Step S704, when the volume range recognizable to the user is a first volume range, performing an amplification operation on the collected speech information.

The volume range that is recognizable to the user is the first volume range, indicating that the user's hearing is mildly impaired.

Step S706, when the volume range recognizable to the user is a second volume range, performing the amplification operation and the display operation on the collected speech information.

The volume range that is recognizable to the user is the second volume range, indicating that the user's hearing is moderately impaired.

Step S708, when the volume range recognizable to the user is a third volume range, performing the display operation on the collected speech information.

The volume range that is recognizable to the user is the third volume range, indicating that the user's hearing is severely impaired.

Step S710, in response to determining, based on the hearing assessment result, that a display operation is required to be performed by the hearing aid device, collecting speech information for auxiliary processing.

Step S712, converting the speech information into text information upon the collection of the speech information, and displaying the text information in a viewing window area of the pair of AR glasses.

Specifically, the first volume range is defined as greater than or equal to 30 dB and less than 60 dB, the second volume range is defined as greater than or equal to 60 dB and less than or equal to 90 dB, and the third volume range is defined as greater than 90 dB.

In this embodiment, by determining a volume range that can be recognized by the user, a corresponding hearing aid mode is determined, so that users with different hearing impairments can be provided with adapted hearing aid solutions. The hearing aid solutions include sound amplification alone, displaying converted text alone, and combining text display and sound amplification, and the like.

In an embodiment, performing the amplification operation on the collected speech information in the steps S704 and S706 specifically includes: detecting an intensity parameter and a frequency parameter of the speech information; adopting a dynamic amplifier to automatically adjust a gain of the intensity parameter and the frequency parameter to adjust the intensity parameter and the frequency parameter to a comfortable listening range.

In this embodiment, when performing the amplification operation, the intensity parameter and the frequency parameter are adjusted based on the hearing assessment result described above, so as to enhance the hearing aid effect of the amplification operation.

In an embodiment, performing the amplification operation on the collected speech information further includes: upon detecting a presence of the pitch loss of the user, performing a compensation operation, according to the type of the pitch loss of the user, for missing frequencies of the speech information.

In this embodiment, when the pitch loss of the user is further detected, the frequency compensation is performed on the speech information according to the type of the pitch loss to enhance the comfort of the user in receiving the amplified speech information.

For example, if the user has a low-frequency hearing loss, the speech information heard will be relatively sharp. Over time, it could potentially lead to further aggravation of the user's hearing impairment. By compensating for the lost frequencies, it not only allows the user to hear the speech information with normal pitch, but also helps to prevent the user's hearing impairment from further deterioration.

As shown in FIG. 8, in an embodiment, when the bone conduction vibration sensor is not provided, or the bone conduction vibration sensor is not involved in the hearing aid control process, the sound source by default is not the user himself or herself. A specific implementation of the step S206 in which, converting the speech information into text information, and displaying the text information in the viewing window area of the pair of AR glasses, includes the following steps.

Step S802, determining a sound source orientation of the speech information.

Step S804, performing face recognition on an image within a range of a viewing window of the pair of the AR glasses based on the sound source orientation to identify a speaking subject of the speech information.

Step S806, converting the speech information into the text information and displaying the text information in the viewing window area, corresponding to the speaking subject, on the hearing aid device.

In this embodiment, in the use environment of communicating with people, by using the sound source localization function and face recognition function of the AR glasses, the speaking subject that is speaking is recognized, and based on the recognition result, not only can the text information be displayed in the viewing window area corresponding to the speaking subject, but also further communication can be carried out with the speaking subject based on the text information, so as to enhance the user's sense of interaction.

As shown in FIG. 9, in an embodiment, another specific implementation of converting the speech information into text information, and displaying the text information in the viewing window area of the pair of AR glasses, includes the following steps.

Step S902, determining a sound source orientation of the speech information.

Step S904, performing face recognition on an image within a range of a viewing window of the pair of the AR glasses based on the sound source orientation to identify a speaking subject of the speech information.

Step S906, converting the speech information into the text information.

Step S908, detecting a spectral parameter of the speech information.

Step S910, distinguishing a gender of a sound source of the speech information based on the spectral parameter.

Step S912, determining a corresponding rendering method based on the gender of the sound source.

Step S914, determining a display style of the text information based on the corresponding rendering method and displaying the text information in the viewing window area.

In this embodiment, the gender of the sound source is detected based on the spectral parameter of the speech information, in order to further match the rendering method based on the gender, and to render the text information based on the rendering method and then display it on a near-to-eye display device (e.g., the hearing aid device as described above). On the one hand, personalized display of the text information is realized, and on the other hand, optimization of displaying of the text information on the AR glasses is realized, which is conducive to improving the user's viewing experience of the text.

In an embodiment, as a further supplement to the step S206 in which converting the speech information into the text information and displaying the text information in the viewing window area of the AR glasses, the method further includes: detecting a distance from the speaking subject based on a visual feature of the speaking subject; and synchronously adjusting a size of a text box of the text information based on the detected distance from the speaking object.

In this embodiment, the distance between the near-to-eye display device and the information source is determined based on a depth camera or some distance mapping algorithm, so as to determine, based on the distance, the size of the text box for displaying the text information. For example, if the distance between the near-to-eye display device and the information source is farther away, the information source occupies a smaller area in the viewing window, and at this time, the text box can be enlarged; and if the distance between the near-to-eye display device and the information source is nearer, the information source occupies a larger area in the viewing window, and at this time, the text box can be appropriately reduced to prevent blocking the information source, which is conducive to improving the sense of interaction between the user and the information source when accessing text information.

In an embodiment, as a further supplement to the step S206 in which converting the speech information into the text information upon the collection of the speech information and displaying the text information in the viewing window area of the AR glasses, the method further includes: invoking, in response to detecting that the collected speech information is to-be-translated speech information, a translation model of a target language to translate the to-be-translated speech information, and obtaining translated text; and displaying the translated text as the text information in the viewing window area of the pair of AR glasses.

In this embodiment, when the received speech information is detected as to-be-translated speech information, the to-be-translated information is translated by invoking the translation model of the target language and then the translated text is obtained, which realizes the extension of the function of the hearing aid device.

It should be noted that the foregoing accompanying drawings are only schematic illustrations of the treatments included in the methods according to exemplary embodiments of the present disclosure, and are not intended to be limiting. It is readily appreciated that the above processing shown in the accompanying drawings does not indicate or limit the chronological order of such processing. It will also be readily understood that these processes may be performed, for example, synchronously or asynchronously in multiple modules.

It will be appreciated by those skilled in the art that aspects of the present disclosure may be implemented as systems, methods, or program products. Accordingly, aspects of the present disclosure may be specifically realized in the form of a complete hardware implementation, a complete software implementation (including firmware, microcode, etc.), or a combination of hardware and software, which may be collectively referred to herein as a "circuit", "module", or "system".

A hearing aid control apparatus 1000 according to the embodiment of the present disclosure is described below with reference to FIG. 10. The hearing aid control apparatus 1000 shown in FIG. 10 is only an example and should not impose any limitations on the functionality and scope of use of the embodiments of the present disclosure.

The hearing aid control apparatus 1000 is represented in the form of a hardware module. The components of the hearing aid control apparatus 1000 may include, but are not limited to: a detection module 1002 configured to play hearing test audio to acquire a feedback signal from a user wearing the hearing aid device based on the hearing test audio, and to determine a hearing assessment result for the user based on the feedback signal; a collection module 1004 configured to collect speech information for auxiliary processing in response to determining, based on the hearing assessment result, that a display operation is required to be performed by the hearing aid device; a display module 1006 configured to convert the speech information into text information upon the collection of the speech information, and to display the text information in a viewing window area of the pair of AR glasses.

In an embodiment, the hearing aid device further includes a bone conduction vibration sensor in the pair of AR glasses, the bone conduction vibration sensor being touchable to a region of a vocal cord of the user. The detection module 1002 is further configured to detect a vibration signal of a vocal cord of the user based on the bone conduction vibration sensor upon the collection of the speech information. The detection module 1002 is further configured to detect the vibration signal of the vocal cord based on a feature comparison model and to determine whether the user is source of the speech information based on a detection result. The hearing aid control apparatus 1000 further includes a conversion module 1008 configured to convert the speech information into the text information in response to determining that the user is not the source of the speech information.

In an embodiment, the detection module 1002 is further configured to: display a hearing detection image in a viewing window of the pair of AR glasses, wherein the hearing detection image includes a plurality of groups of different combinations of long and short graphics, and characters corresponding to each group of combinations of long and short images. The hearing aid control apparatus 1000 further includes: a playback module 1010 configured to play, during an assessment, at least one of a plurality of groups of sounds with long and short lengths based on a specified sound volume and/or sound pitch as the hearing detection audio, each group of sounds with long and short lengths corresponding to a group of combinations of long and short images; and a receiving module 1012 configured to receive a feedback result from the user on an identification of the sounds with long and short lengths as the feedback signal. The detection module 1002 is further configured to determine the hearing assessment result for the user based on the feedback result, wherein the sound volume includes bass, alto, and soprano, and the sound pitch includes low frequency, mid-frequency, and high frequency, and wherein a plurality of assessments are performed based on different sound volumes and/or different sound pitches.

In an embodiment, the receiving module 1012 is further configured to: display, after playing the sounds with long and short lengths, a correct option and an incorrect option for the characters corresponding to the sounds with long and short lengths in the viewing window; and receive a selection result from the user for the correct option and the incorrect option, and determine the selection result as the feedback result.

In an embodiment, the receiving module 1012 is further configured to: collect a recognition speech from the user for the characters corresponding to the sounds with long and short lengths, and determine the recognition speech as the feedback result.

In an embodiment, the detection module 1002 is further configured to: determine, based on the feedback result, a feedback character fed back from the user; detect whether the feedback character is correct; and evaluate, based on the detection result, a volume range recognizable to the user and a type of pitch loss of the user, as the hearing assessment result for the user.

In an embodiment, the hearing aid control apparatus 1000 further includes a speech information processing module 1014 configured to perform an amplification operation on the collected speech information when the volume range is a first volume range; to perform the amplification operation and the display operation on the collected speech information when the volume range is a second volume range; to perform the display operation on the collected speech information when the volume range is a third volume range.

In an embodiment, the speech information processing module 1014 is further configured to detect an intensity parameter and a frequency parameter of the speech information; and adopt a dynamic amplifier to automatically adjust a gain of the intensity parameter and the frequency parameter to adjust the intensity parameter and the frequency parameter to a comfortable listening range.

In an embodiment, the speech information processing module 1014 is further configured to: upon detecting a presence of the pitch loss of the user, perform a compensation operation, according to the type of the pitch loss of the user, for missing frequencies of the speech information.

In an embodiment, the display module 1006 is further configured to: determine a sound source orientation of the speech information; perform face recognition on an image within a range of a viewing window of the pair of the AR glasses based on the sound source orientation to identify a speaking subject of the speech information; and convert the speech information into the text information and display the text information in the viewing window area, corresponding to the speaking subject, on the hearing aid device.

In an embodiment, the display module 1006 is further configured to: detect a spectral parameter of the speech information; distinguish a gender of a sound source of the speech information based on the spectral parameter; determine a corresponding rendering method based on the gender of the sound source; and determine a display style of the text information based on the corresponding rendering method and display the text information in the viewing window area.

In an embodiment, the display module 1006 is further configured to: detect a distance from the speaking subject based on a visual feature of the speaking subject; and synchronously adjusting a size of a text box of the text information based on the detected distance from the speaking object.

In an embodiment, the display module 1006 is further configured to: invoke, in response to detecting that the collected speech information is to-be-translated speech information, a translation model of a target language to translate the to-be-translated speech information, and obtain translated text; and display the translated text as the text information in the viewing window area of the pair of AR glasses.

A hearing aid device 1100 according to the embodiment of the present disclosure is described below with reference to FIG. 11. The hearing aid device 1100 shown in FIG. 11 is only an example and should not impose any limitations on the functionality and scope of use of embodiments of the present disclosure.

Figure 11:
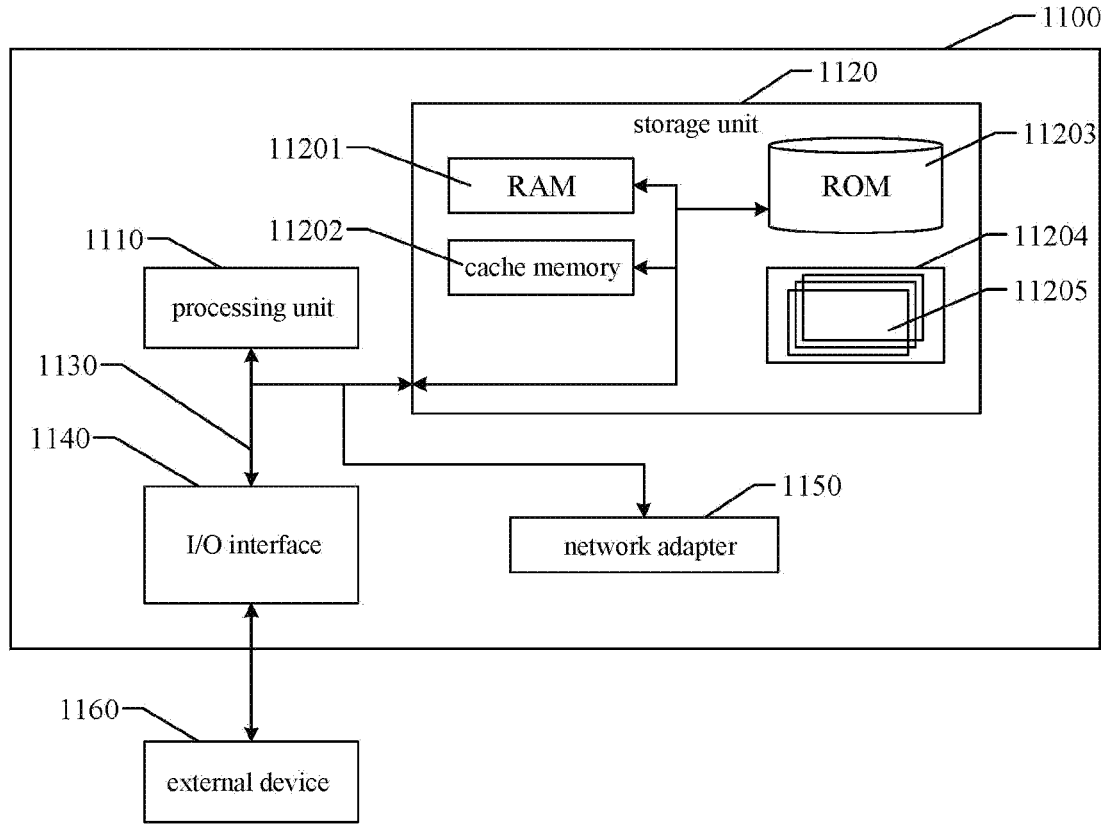
FIG. 11 illustrates a schematic diagram of a hearing aid device in an embodiment of the present disclosure.

As shown in FIG. 11, the hearing aid device 1100 is represented as a general purpose computing device. Components of the hearing aid device 1100 may include, but are not limited to: at least one processing unit 1110, at least one storage unit 1120, and a bus 1130 that connects the different system components, including the storage unit 1120 and the processing unit 1110.

The storage unit stores program code that can be executed by the processing unit 1110 to cause the processing unit 1110 to perform the steps described in various exemplary embodiments of the present disclosure. For example, the processing unit 1110 may perform steps S202, S204, and S206 as shown in FIG. 2, as well as other steps defined in the hearing aid control method of the present disclosure.

The storage unit 1120 may include a readable medium in the form of a volatile storage unit, such as a random access memory (RAM) 11201 and/or a cache memory 11202, and may further include a read-only memory (ROM) 11203.

The storage unit 1120 may also include a program/utility 11204 having a set of (at least one) program modules 11205 including, but not limited to: an operating system, one or more applications, other program modules, and program data. Each of these examples, or some combination of them, may include an implementation of a network environment.

The bus 1130 may represent one or more of several types of bus structures, including a memory bus or memory controller, a peripheral bus, a graphics acceleration port, a processing unit, or a local bus using any of a variety of bus structures.

The hearing aid device 1100 may also communicate with one or more external devices 1160 (e.g., keyboards, pointing devices, Bluetooth® devices, etc.), or with one or more devices that enable a user to interact with the hearing aid device, and/or with any device (e.g., routers, modems, etc.) that enables the hearing aid device 1100 to communicate with one or more other computing devices. Such communication may occur via an input/output (I/O) interface 1150. Further, the hearing aid device 1100 may also communicate with one or more networks (e.g., a local area network (LAN), a wide area network (WAN), and/or a public network, e.g., the Internet) via a network adapter 1150. As shown, the network adapter 1150 communicates with other modules of the hearing aid device 1100 via the bus 1130. It should be appreciated that, although not shown in the figures, other hardware and/or software modules may be used in conjunction with the hearing aid device, including, but not limited to: microcode, device drivers, redundant processing units, external disk drive arrays, redundant arrays of independent disks (RAID) systems, tape drives, and data backup storage systems.

By the above description of the embodiments, it will be readily understood by those skilled in the art that the exemplary embodiments described herein can be realized by means of software, or by means of software combined with the necessary hardware. Thus, a technical solution according to an embodiment of the present disclosure may be embodied in the form of a software product, which may be stored on a non-volatile storage medium (which may be a CD-ROM, a USB flash drive, a removable hard disk, etc.) or on a network, and which includes a number of instructions to enable a computing device (which may be a personal computer, a server, a terminal device, or a network device, etc.) to perform the methods according to the embodiments of the present disclosure.

In exemplary embodiments of the present disclosure, there is also provided a computer-readable storage medium on which is stored a program product capable of implementing the method described above in this specification. In some possible embodiments, aspects of the present disclosure may also be implemented in the form of a program product including program code which, when the program product is run on a terminal device, is used to cause the terminal device to perform the steps described in various exemplary embodiments of the present disclosure.

Program products according to embodiments of the present disclosure for implementing the methods described above may employ portable compact disk read-only memory (CD-ROM) and include program code, and may be run on a terminal device (such as a personal computer). However, the program products of the present disclosure are not limited thereto, and for the purposes of this document, a readable storage medium may be any tangible medium containing or storing a program that may be used by, or in combination with, an instruction execution system, apparatus, or device.

The computer readable signal medium may include a data signal propagated in baseband or as part of a carrier, which carries readable program code. Such propagated data signals may take a variety of forms, including, but not limited to, electromagnetic signals, optical signals, or any suitable combination of the foregoing. The readable signal medium may also be any readable medium other than a readable storage medium, which may send, propagate, or transmit a program for use by, or in conjunction with, a command execution system, apparatus, or device.

The program code contained on the readable medium may be transmitted by any suitable medium, including, but not limited to, wireless, wire, fiber optic cable, radio frequency (RF), etc., or any suitable combination thereof.

Program code for performing the operations of the present disclosure may be written in any combination of one or more programming languages, including object-oriented programming languages such as Java, C++, etc., as well as conventional procedural programming languages such as "C" or the like. The program code may be executed entirely on the user computing device, partially on the user device, as a stand-alone software package, partially on the user computing device and partially on a remote computing device, or entirely on a remote computing device or server. In the case of a remote computing device, the remote computing device may be connected to the user computing device over any kind of network, including a local area network (LAN) or a wide area network (WAN), or it may be connected to an external computing device (e.g., through the Internet utilizing an Internet service provider).

It should be noted that although several modules or units of the apparatus for executing acts are referred to in the detailed description above, the division of the modules or units is not mandatory. In fact, according to embodiments of the present disclosure, the features and functions of two or more modules or units described above may be specified in a single module or unit. Conversely, the features and functions of one module or unit described above may be further divided to be specified by multiple modules or units.

Furthermore, although the steps of the methods of the present disclosure are depicted in the accompanying drawings in a particular order, it is not required or implied that the steps must be performed in that particular order or that all of the steps shown must be performed in order to achieve the desired results. Additionally or alternatively, certain steps may be omitted, multiple steps may be combined into a single step, and/or a single step may be divided into multiple steps, etc.

By the above description of the embodiments, it will be readily understood by those skilled in the art that the exemplary embodiments described herein can be realized by means of software, or by means of software combined with the necessary hardware. Thus, a technical solution according to an embodiment of the present disclosure may be embodied in the form of a software product, which may be stored on a non-volatile storage medium (which may be a CD-ROM, a USB flash drive, a removable hard disk, etc.) or a network, and which includes a number of instructions to cause a computing device (which may be a personal computer, a server, a mobile terminal, or a network device, etc.) to perform a method according to an embodiment of the present disclosure.

Other embodiments of the present disclosure will be readily apparent to those skilled in the art upon consideration of the specification and practice of the disclosure disclosed herein. This application is intended to cover any variations, uses, or adaptations of the present disclosure that follow the general principles of the present disclosure and include means of common knowledge or practice in the art not disclosed herein. The specification and the embodiments are to be regarded as exemplary only, and the true scope and spirit of the present disclosure is indicated by the appended claims.

What is claimed is:

1. A hearing aid control method, comprising:
providing a hearing aid device, wherein the hearing aid device comprises a pair of Augmented Reality (AR) glasses, a bone conduction vibration sensor in the pair of AR glasses, a sound collection device, and an in-ear broadcasting device that are provided in the pair of AR glasses, wherein the sound collection device is configured to collect speech, the in-ear broadcasting device is configured to play audio, and the bone conduction vibration sensor is touchable to a skull region of the user;
displaying a hearing detection image in a viewing window area of the pair of AR glasses, playing hearing test audio to acquire a feedback signal from a user wearing the hearing aid device based on the hearing test audio, and determining a hearing assessment result for the user based on the feedback signal, wherein the hearing assessment result comprises a hearing level;

in response to determining, based on the hearing assessment result, that a display operation is required to be performed by the hearing aid device, collecting speech information; and
converting the speech information into text information upon the collection of the speech information, and displaying the text information in the viewing window area of the pair of AR glasses, by:
detecting, based on the bone conduction vibration sensor, a vibration signal of a vocal cord of the user upon collecting the speech information;
detecting the vibration signal of the vocal cord based on a feature comparison model and determining, based on a detection result, whether the user is a sound source of the speech information; and
determining, based on a result of the determination whether the user is the sound source of the speech information, a corresponding rendering method for displaying the text information in the viewing window area of the pair of AR glasses, comprising:
performing the display operation based on a first rendering method in response to determining that the user is not the sound source of the speech information; and
performing the display operation based on a second rendering method in response to determining that the user is the sound source of the speech information when converting the speech information into the text information;
wherein the first rendering method and the second rendering method are different rendering methods configured based on at least one of: color, font, display ratio, or display speed; and
when displaying the text information based on the second rendering method, receiving feedback information from the user to determine a pronunciation level of the user based on the feedback information.

2. The method of claim 1, wherein converting the speech information into the text information, and displaying the text information in the viewing window area of the pair of AR glasses, further comprises:
determining a sound source orientation of the speech information;
performing face recognition on an image within a range of a viewing window of the pair of the AR glasses based on the sound source orientation to identify a speaking subject of the speech information; and
converting the speech information into the text information and displaying the text information in the viewing window area, corresponding to the speaking subject, on the hearing aid device.

3. The method of claim 1, wherein converting the speech information into the text information, and displaying the text information in the viewing window area of the pair of AR glasses, further comprises:
detecting a spectral parameter of the speech information;
distinguishing a gender of a sound source of the speech information based on the spectral parameter;
determining a corresponding rendering method based on the gender of the sound source; and
determining a display style of the text information based on the corresponding rendering method and displaying the text information in the viewing window area.

4. The method of claim 2, wherein converting the speech information into the text information, and displaying the text information in the viewing window area of the pair of AR glasses, further comprises:

detecting a distance between the user and the speaking subject based on a visual feature of the speaking subject; and synchronously adjusting a size of a text box of the text information based on the detected distance between the user and the speaking object.

5. The method of claim 1, wherein converting the speech information into the text information upon the collection of the speech information, and displaying the text information in the viewing window area of the pair of AR glasses, further comprises:

invoking, in response to detecting that the collected speech information is to-be-translated speech information, a translation model of a target language to translate the to-be-translated speech information, and obtaining translated text; and displaying the translated text as the text information in the viewing window area of the pair of AR glasses.

6. The method of claim 1, wherein the hearing detection image comprises a plurality of groups of different combinations of long and short graphics, and characters corresponding to each group of combinations of long and short graphics; and wherein playing the hearing test audio to acquire the feedback signal from the user wearing the hearing aid device based on the hearing test audio, and determining the hearing assessment result for the user based on the feedback signal, further comprises:

playing, during an assessment, at least one of a plurality of groups of sounds with long and short lengths based on a specified sound volume and/or sound pitch as the hearing detection audio, each group of sounds with long and short lengths corresponding to a group of combinations of long and short graphics;

receiving a feedback result from the user on an identification of the sounds with long and short lengths as the feedback signal; and determining the hearing assessment result for the user based on the feedback result, wherein the sound volume comprises bass, alto, and soprano, and the sound pitch comprises low frequency, mid-frequency, and high frequency, and wherein the method further comprises performing a plurality of assessments based on different sound volumes and/or different sound pitches.

7. The method of claim 6, wherein receiving the feedback result from the user on the identification of the sounds with long and short lengths, further comprises:

displaying, after playing the sounds with long and short lengths, a correct option and an incorrect option for the characters corresponding to the sounds with long and short lengths in the viewing window; and receiving a selection result from the user for the correct option and the incorrect option, and determining the selection result as the feedback result.

8. The method of claim 6, wherein receiving the feedback result from the user on the identification of the sounds with long and short lengths, further comprises:

collecting a recognition speech from the user for the characters corresponding to the sounds with long and short lengths, and determining the recognition speech as the feedback result.

9. The method of claim 6, wherein determining the hearing assessment result for the user based on the feedback result, further comprises:

determining, based on the feedback result, a feedback character fed back from the user;

detecting whether the feedback character is correct; and determining, based on the detection result, a volume range recognizable to the user and a type of pitch loss of the user, as the hearing assessment result for the user.

10. The method of claim 9, wherein, before collecting the speech information for auxiliary processing in response to determining, based on the hearing assessment result, that the display operation is required to be performed by the hearing aid device, the method further comprises:

in response to determining that the volume range is a first volume range, performing an amplification operation on the collected speech information;

in response to determining that the volume range is a second volume range, performing the amplification operation and the display operation on the collected speech information; and in response to determining that the volume range is a third volume range, performing the display operation on the collected speech information.

11. The method of claim 10, wherein performing the amplification operation on the collected speech information, further comprises:

detecting an intensity parameter and a frequency parameter of the speech information; and adopting a dynamic amplifier to automatically adjust a gain of the intensity parameter and the frequency parameter to adjust the intensity parameter and the frequency parameter to a comfortable listening range.

12. The method of claim 10, wherein performing the amplification operation on the collected speech information, further comprises:

upon detecting a presence of the pitch loss of the user, performing a compensation operation, according to the type of the pitch loss of the user, for missing frequencies of the speech information.

13. A hearing aid device, comprising:

a pair of Augmented Reality (AR) glasses;

a bone conduction vibration sensor provided in the pair of AR glasses, the bone conduction vibration sensor being touchable to a region of a vocal cord of the user and configured to detect a vibration signal of the vocal cord of the user;

an in-ear broadcasting device provided in the pair of AR glasses, configured to play hearing test audio;

a processor implemented in hardware configured to acquire a feedback signal from a user wearing the hearing aid device based on the hearing test audio, and to determine a hearing assessment result for the user based on the feedback signal; and a sound collection device provided in the pair of AR glasses, configured to collect speech information, in response to determining, based on the hearing assessment result, that a display operation is required to be performed by the hearing aid device;

wherein the processor is further configured to convert the speech information into text information upon the collection of the speech information, wherein the processor is further configured to detect the vibration signal of the vocal cord based on a feature comparison model to determine whether the user is sound source of the speech information; and wherein the pair of AR glasses is further configured to: perform the display operation based on a first rendering method in response to determining that the user is not the sound source of the speech information; and perform the display operation based on a second rendering method in response to determining that the user is the sound source of the speech information.

14. A hearing aid device, comprising:

a pair of augmented reality (AR) glasses, a bone conduction vibration sensor in the pair of AR glasses, a sound collection device, and an in-ear broadcasting device, the sound collection device being configured to collect speech, the bone conduction vibration sensor being touchable to a skull region of the user, and the in-ear broadcasting device being configured to play audio;

at least one hardware processor; and program instructions stored in memory that are executable by the at least one hardware processor that, when executed, direct the at least one hardware processor to:

display a hearing detection image in a viewing window area of the pair of AR glasses, playing hearing test audio to acquire a feedback signal from a user wearing the hearing aid device based on the hearing test audio, and determining a hearing assessment result for the user based on the feedback signal, wherein the hearing assessment result comprises a hearing level;

in response to determining, based on the hearing assessment result, that a display operation is required to be performed by the hearing aid device, collect speech information; and convert the speech information into text information upon the collection of the speech information, and display the text information in the viewing window area of the pair of AR glasses by:

detecting a vibration signal of a vocal cord of the user based on the bone conduction vibration sensor upon the collection of the speech information; detecting the vibration signal of the vocal cord based on a feature comparison model and determining whether the user is sound source of the speech information based on a detection result; and determining, based on a result of the determining whether the user is the sound source of the speech information, a corresponding rendering method for displaying, based on the corresponding rendering method, the text information in the viewing window area of the pair of AR glasses, comprising:

performing the display operation based on a first rendering method in response to determining that the user is not the sound source of the speech information; and performing the display operation based on a second rendering method in response to determining that the user is the sound source of the speech information when converting the speech information into the text information;

wherein the first rendering method and the second rendering method are different rendering methods configured based on at least one of: color, font, display ratio, or display speed; and when displaying the text information based on the second rendering method, receive feedback information from the user to determine a pronunciation level of the user based on the feedback information.

15. A non-transitory computer-readable storage medium having stored thereon a computer program, wherein the computer program, when executed by a hardware processor, causes the hardware processor to implement the method of claim 1.

\* \* \* \* \*